(12) United States Patent
Tokuda et al.

(10) Patent No.: US 9,517,677 B2
(45) Date of Patent: Dec. 13, 2016

(54) VEHICLE AIR CONDITIONING SYSTEM

(75) Inventors: Masaaki Tokuda, Machida (JP);
Shinichirou Mizoguchi, Atsugi (JP);
Satoshi Ogihara, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 592 days.

(21) Appl. No.: 13/702,954

(22) PCT Filed: May 19, 2011

(86) PCT No.: PCT/IB2011/001081
§ 371 (c)(1),
(2), (4) Date: Dec. 7, 2012

(87) PCT Pub. No.: WO2011/158076
PCT Pub. Date: Dec. 22, 2011

(65) Prior Publication Data
US 2013/0075075 A1 Mar. 28, 2013

(30) Foreign Application Priority Data

Jun. 16, 2010 (JP) ................................ 2010-137027

(51) Int. Cl.
*B60H 1/00* (2006.01)
*B60H 1/14* (2006.01)
*B60L 1/00* (2006.01)

(52) U.S. Cl.
CPC ...... *B60H 1/00007* (2013.01); *B60H 1/00278* (2013.01); *B60H 1/143* (2013.01);
(Continued)

(58) Field of Classification Search
CPC . B60H 1/00007; B60H 1/00278; B60H 1/143; B60H 2001/00307
(Continued)

(56) References Cited

U.S. PATENT DOCUMENTS 4,930,455 A * 6/1990 Creed ................ B60H 1/00885
123/41.02
5,493,870 A 2/1996 Kodama et al.
(Continued)

FOREIGN PATENT DOCUMENTS

CN 1227926 A 12/2000
CN 101549627 A 10/2009
(Continued)

OTHER PUBLICATIONS

An English translation of the Chinese Office Action for the corresponding Chinese patent application No. 201180029206.1 issued on Aug. 1, 2014.

*Primary Examiner* — Len Tran
*Assistant Examiner* — Claire Rojohn, III
(74) *Attorney, Agent, or Firm* — Global IP Counselors, LLP

(57) ABSTRACT

A vehicle air conditioning system includes a duct, a refrigerant evaporator, an air conditioning cooling flow passage, a heater core, a heater hot fluid flow passage, a heat exchanger, an electric heater, an electrical component cooling flow passage, a communication flow passage, a fluid temperature sensor and a flow passage selector valve. The duct provides air to a vehicle cabin interior. The cooling flow passage provides cooled refrigerant to the evaporator. The hot fluid flow passage provides hot fluid to the heater core. The heat exchanger exchanges heat between the refrigerant and the hot fluid. The heater warms the hot fluid having undergone heat exchange. The cooling flow passage cools an electrical component. The communication flow passage parallelly connects the hot fluid and electrical component flow passages. The valve allows hot fluid to flow into the cooling flow passage when the hot fluid has a high temperature.

6 Claims, 10 Drawing Sheets

(52) U.S. Cl.
CPC .... B60L 1/003 (2013.01); *B60H 2001/00307* (2013.01); *B60L 2240/34* (2013.01); *B60L 2240/36* (2013.01); *B60L 2240/662* (2013.01); *Y02T 10/7291* (2013.01); *Y02T 90/16* (2013.01)

(58) Field of Classification Search
USPC ................. 165/202; 62/244, 324.1, 115, 498
See application file for complete search history.

(56) References Cited

U.S. PATENT DOCUMENTS

| | | | |
|---|---|---|---|
| 5,839,656 A * | 11/1998 | Yamano | B60H 1/00278 180/65.1 |
| 6,047,770 A * | 4/2000 | Suzuki | B60H 1/00007 165/202 |
| 6,237,357 B1 * | 5/2001 | Hirao | B60H 1/004 62/239 |
| 6,422,308 B1 * | 7/2002 | Okawara et al. | 165/202 |
| 6,834,511 B2 * | 12/2004 | Hatakeyama | B60H 1/00849 62/159 |
| 6,895,773 B2 | 5/2005 | Amaral | |
| 8,448,460 B2 | 5/2013 | Dogariu et al. | |
| 2002/0095943 A1 * | 7/2002 | Hatakeyama | B60H 1/00007 62/324.1 |
| 2005/0133215 A1 | 6/2005 | Ziehr et al. | |
| 2005/0178523 A1 * | 8/2005 | Itoh et al. | 165/42 |
| 2008/0196877 A1 * | 8/2008 | Zeigler | B60H 1/00907 165/202 |
| 2008/0229782 A1 * | 9/2008 | Takegami et al. | 62/513 |
| 2008/0251235 A1 | 10/2008 | Zhou | |
| 2009/0283604 A1 | 11/2009 | Martinchick et al. | |
| 2009/0317697 A1 | 12/2009 | Dogariu et al. | |
| 2011/0016896 A1 * | 1/2011 | Oomura | B60H 1/00785 62/155 |
| 2014/0311180 A1 * | 10/2014 | Kawakami | B60H 1/00278 62/498 |

FOREIGN PATENT DOCUMENTS

| | | |
|---|---|---|
| CN | 101580006 A | 11/2009 |
| CN | 101614450 A | 12/2009 |
| EP | 1282532 B1 | 2/2003 |
| JP | 3477868 | 12/2003 |

* cited by examiner

VEHICLE AIR CONDITIONING SYSTEM

CROSS-REFERENCE TO RELATED APPLICATIONS

This application is a U.S. National stage of International Application No. PCT/IB2011/001081, filed May 19, 2011. This application claims priority to Japanese Patent Application No. 2010-137027, filed on Jun. 16, 2010. The entire disclosure of Japanese Patent Application No. 2010-137027 is hereby incorporated herein by reference.

BACKGROUND

Field of the Invention

The present invention generally relates to a vehicle air conditioning system. More particularly, the present invention relates to a vehicle air conditioning system that can perform heating and dehumidifying while reducing electric power consumption.

Background Information

Vehicle air conditioning systems are known in the art. A conventional vehicle air conditioning system can operate to condition air inside a vehicle cabin without using engine coolant. When such a system is operated in a heating mode, the system typically uses hot fluid or heated air that has been heated by an electric heater or a combustion heater. The system could also use heat that is extracted by a heat pump from air outside of the vehicle.

Since an electric vehicle does not have a combustion engine, the air conditioning system is unable to use heat that would be discharged from a combustion engine. Thus, an air conditioning system in an electric vehicle can use an electric heater. Since the amount of electric power consumed by an electric heater affects a distance that the vehicle can travel without recharging its battery, the distance typically declines in the winter and other times when the electric power consumption of the electric heater is large. Therefore, a system described in Japanese Patent No. 3477868 is configured to use heat of condensation discharged from a refrigerant-fluid heat exchanger during a heating mode in order to reduce electric power consumption.

SUMMARY

The vehicle air conditioning system described in Japanese Patent No. 3477868 is configured to introduce outside air during a heating mode even when the vehicle is in a cold area where the ambient air temperature is low. However, the heating mode efficiency is poor when the warm air inside the vehicle cabin is discharged to the cabin exterior without being used. Also, if heating is conducted by recirculating interior cabin air, then dehumidification of the air can be necessary because the humidity inside the cabin will rise. Furthermore, an increase in the dehumidification rate will typically cause an increase in the amount of electric power consumed by the electric heater. Consequently, the distance that the electric vehicle can travel without recharging its battery can decline.

Accordingly, an object of the present invention is to provide a vehicle air conditioning system that can perform heating and dehumidifying while reducing electric power consumption.

In view of the state of the know technology, a vehicle air conditioning system basically comprises a duct, a refrigerant evaporator, an air conditioning cooling flow passage, a heater core, a heater hot fluid flow passage, a heat exchanger, an electric heater, an electrical component cooling flow passage, a communication flow passage, a fluid temperature sensor and a flow passage selector valve. The duct is configured to provide air to a vehicle cabin interior. The refrigerant evaporator is disposed in the duct. The air conditioning cooling flow passage is configured to provide cooled refrigerant to the refrigerant evaporator. The heater core is disposed in the duct at a position downstream of the refrigerant evaporator. The heater hot fluid flow passage is configured to provide hot fluid to the heater core. The heat exchanger is configured to exchange heat between a refrigerant flowing in the air conditioning cooling flow passage and hot fluid flowing in the heater hot fluid flow passage. The electric heater is disposed along the heater hot fluid flow passage in a position downstream of the heat exchanger and configured to further warm hot fluid that has undergone a heat exchange in the heat exchanger. The electrical component cooling flow passage is configured to cool an electrical component installed in the vehicle by passing heat from the electrical component through a cabin exterior heat exchanger. The communication flow passage is configured to connect the heater hot fluid flow passage and the electrical component flow passage together such that the heater hot fluid flow passage and the electrical component are arranged in parallel. The fluid temperature sensor is configured to detect a temperature of the hot fluid flowing in the heater hot fluid flow passage. The flow passage selector valve is disposed at a connecting portion between the heater hot fluid flow passage and the communication flow passage and is configured to allow hot fluid flowing in the heater hot fluid flow passage to flow into the electrical component cooling flow passage when a temperature of the hot fluid detected by the fluid temperature sensor is higher than a prescribed temperature.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
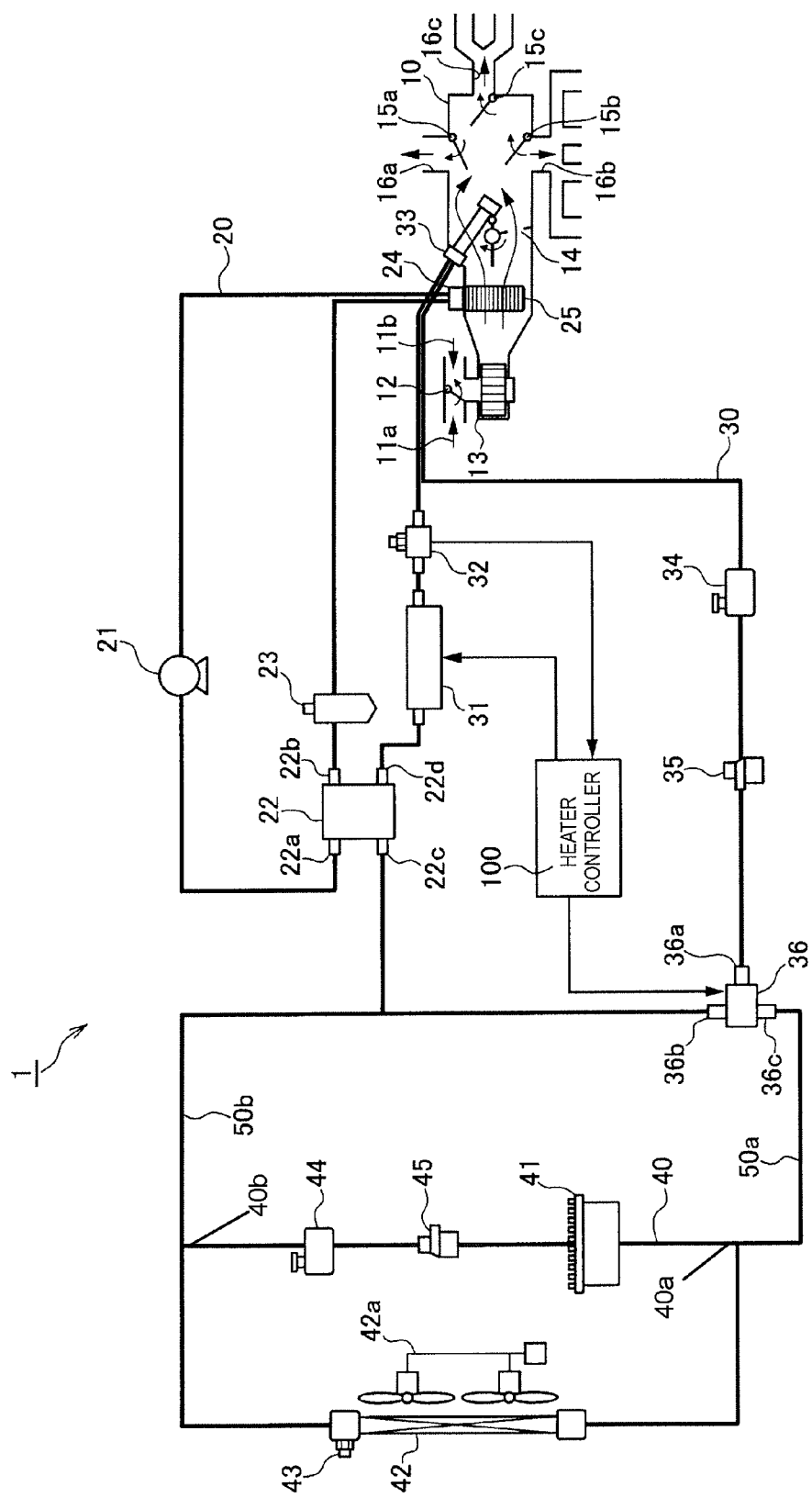
FIG. 1 is a system diagram illustrating an example of a vehicle air conditioning system according to a disclosed embodiment.

FIG. 1 is a system diagram illustrating an example of a vehicle air conditioning system 1 in accordance with a disclosed embodiment. The vehicle air conditioning system 1 includes a duct 10 through which air flows before being delivered to a cabin interior. The vehicle air conditioning system 1 further includes an air conditioning cooling flow passage 20 through which a refrigerant used to adjust a temperature of the air flows. The vehicle air conditioning system 1 also includes a heater hot fluid flow passage 30 through which hot fluid flows. As further shown, the vehicle air conditioning system 1 includes an electrical component cooling flow passage 40 through which a coolant flows to cool an electrical component installed in the vehicle. In addition, the vehicle air conditioning system 1 includes a communication flow passage 50 that is configured to couple the heater hot fluid flow passage 30 and the electrical component cooling flow passage 40 together. Moreover, a heater controller 100 is configured to control a temperature of the hot fluid flowing in the heater hot fluid flow passage 30.

As further shown, the duct 10 includes an outside air intake port 11a and an inside air intake port 11b. The duct 10 further includes an inside air/outside air selector damper 12, a blower 13, an evaporator 25 and an air mix damper 14. The duct 10 also includes a heater core 33, a mode selector damper 15 and a discharge outlet 16.

The outside air intake port 11a and the inside air intake port 11b are disposed on an upstream side of the duct 10, and the inside air/outside air selector damper 12 operates to select which air will be received into the duct 10. The damper 12 is configured to turn freely and to be driven by a servomotor or other actuator (not shown). In this embodiment, inside air received into the duct 10.

Thus, the air is drawn to a downstream side of the duct 10 in accordance with a rotational speed of the blower 13. The blower 13 is arranged inside a scroll casing of the duct 10 and the rotational speed of the blower 13 is controlled by a blower motor (not shown). The evaporator 25 is installed inside a cleaning unit case in an intermediate portion of the duct 10 located downstream of the blower 13. The refrigerant in the evaporator 25 exchanges heat with air passing through the evaporator 25 and evaporates as it cools the air. The operation of the evaporator 25 is explained in more detail below.

The air mix damper 14 is arranged in a middle portion of the duct 10 in a position downstream of the evaporator 25 and can turn freely. The air mix damper 14 is driven with a stepping motor, a servomotor, or another type of actuator (not shown). The air mix damper 14 adjusts a ratio of the amount of air that passes through the heater core 33 and an amount of air that circumvents the heater core 33 after the air is cooled by the evaporator 25. Immediately after operation in a heating mode starts, the air mix damper 14 is opened fully such that air cooled by the evaporator 25 passes through the heater core 33.

The heater core 33 is disposed inside a heater unit case of the duct 10 at a position downstream of the air mix damper 14. The hot fluid inside the heater core 33 exchanges heat with air that passes through the heater core 33 due to the adjustment of the air mix damper 14, thus warming the air. The operation of the heater core 33 is explained in more detail below.

After the temperature of the air has been adjusted, the air flows to a discharge port 16 located farther downstream in the duct 10. The discharge port 16 comprises a defrost discharge port 16a, a center and side face discharge port 16b, and a hood discharge port 16c. Each of the discharge ports 16a through 16c has a mode selector damper 15a through 15c, respectively. The mode selector dampers 15a through 15c can turn freely and adjust an amount of air flowing through each of the discharge ports 16a through 16c. Each of the mode selector dampers 15a through 15c is driven by a servomotor or other type of actuator (not shown).

The air conditioning cooling flow passage 20 connects a compressor 21, a heat exchanger 22, a receiver 23, a pressure reducing value 24, and the evaporator 25. The refrigerant flowing in the air conditioning cooling flow passage 20 changes state as the refrigerant circulates through the inside of the flow passage.

The compressor 21 compresses gaseous refrigerant (in a gaseous state) and discharges the refrigerant as a high-temperature, high-pressure refrigerant gas. The compressor 21 is driven with an electric motor (not shown). The compressor 21 includes an inverter (not shown) that controls a rotational speed of the electric motor. Since changing the speed of the electric motor changes an amount of refrigerant gas discharged from the compressor 21, the amount of refrigerant flowing through the air conditioning cooling passage 20 can be adjusted by adjusting the motor speed. Thus, a heating rate of the heat exchanger 22 (explained later) and a cooling rate of the evaporator 25 are determined based on the rotational speed of the compressor 21.

The heat exchanger 22 is disposed downstream of the compressor 21. A high-temperature, high-pressure refrigerant gas discharged from the compressor 21 flows into a refrigerant inlet port 22a of the heat exchanger 22. The heat exchanger 22 condenses and liquefies the high-temperature, high-pressure refrigerant gas. The refrigerant gas is cooled in, for example, an isobaric manner. The heat of the refrigerant gas heats the hot fluid flowing through the heater hot fluid flow passage 30. The substantially liquidized refrigerant flows from a refrigerant outlet port 22b of the heat exchanger 22 to the receiver 23.

As shown, the receiver 23 is disposed downstream of the heat exchanger 22. The receiver 22 separates the liquid refrigerant from the gaseous refrigerant and sends only the liquid refrigerant or substantially only the liquid refrigerant to the pressure reducing valve 24. The vapor-liquid separator can be an accumulator. The accumulator can be arranged between the pressure reducing valve 24 and the compressor 21.

The pressure reducing valve 24 is disposed downstream of the receiver 23. The pressure reducing valve in this example can be an expansion valve. By reducing the pressure, the pressure reducing valve 24 vaporizes the liquid refrigerant and injects the refrigerant into the evaporator 25. As a result, the liquid refrigerant changes into a low-temperature, low-pressure refrigerant in a vapor-liquid two-phase state.

The evaporator 25 is disposed in the duct 10 as explained previously. Air passing around the evaporator 25 exchanges heat with the low-temperature refrigerant inside the evaporator 25. The refrigerant receives heat from the air and evaporates. Meanwhile, the air loses heat and its temperature decreases. Moisture in the air condenses on a surface of the chilled evaporator 25 and forms fluid (e.g., water) droplets. As a result, the air flowing through the duct 10 is dehumidified and cooled by the evaporator 25. The refrigerant exiting the evaporator 25 is returned to the compressor 21 and compressed again.

A heater hot fluid flow passage 30 connects the aforementioned heat exchanger 22, the electric heater 31, a fluid temperature sensor 32, a heater core 33, a reserve tank 34, a fluid pump 35, and a flow passage selector pump 36. Hot fluid flows through the heater hot fluid flow passage 30. The hot fluid undergoes temperature changes as it is circulated through the passage. The fluid can be, for example, water or an aqueous solution of, for example, ethylene glycol or other antifreeze solutions.

The heat exchanger 22 heats the hot fluid flowing through the heater hot fluid flow passage 30 using heat from the refrigerant flowing through the air conditioning cooling flow passage 20. The hot fluid flowing into the heat exchanger 22 through the hot fluid inlet port 22*c* is heated and discharged from the hot fluid outlet port 22*d*. The heating of the hot fluid in the heat exchanger 22 causes the refrigerant to be circulated through the air conditioning cooling flow passage 20 by the compressor 21.

Figure 2:
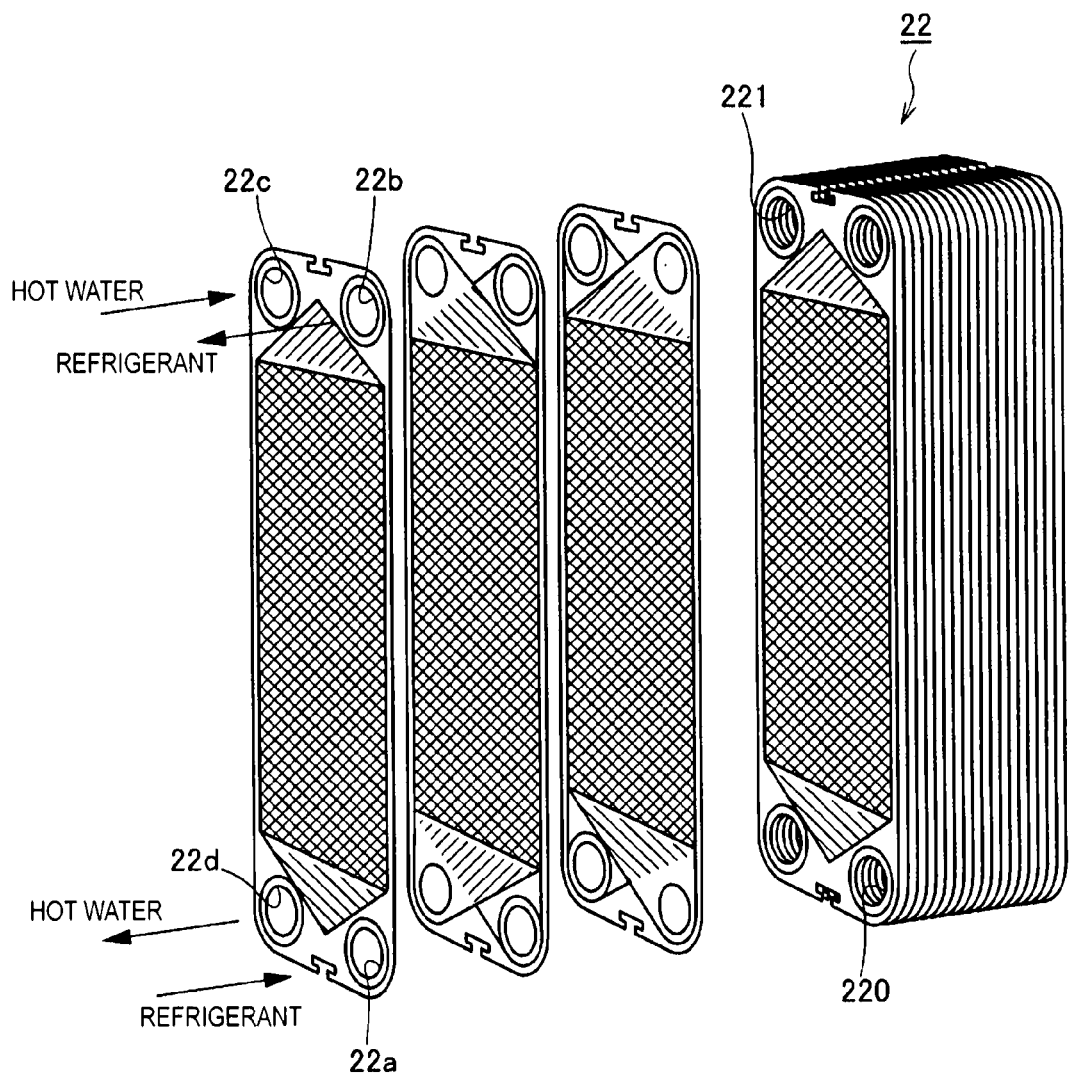
FIG. 2 shows an example of a structure of a heat exchanger in the vehicle air conditioning system.

An example of the heat exchanger 22 will now be explained with reference to FIG. 2. The heat exchanger 22 comprises, for example, a flow passage 220 connected to the air conditioning cooling flow passage 20, and a flow passage 221 connected to the heater hot fluid flow passage 30. The heat exchanger 22 is a plate heat exchanger made of an aluminum alloy or other metal. The plate heat exchanger can comprise press-formed metal plates stacked together with packing in-between. The flow passage 220 and the flow passage 221 are disposed in parallel inside the heat exchanger 22. The coolant inlet port 22*a* of the flow passage 220 is adjacent to the hot fluid outlet port 22*d* of the flow passage 221, and the coolant outlet port 22*b* of the flow passage 220 is adjacent to the hot fluid inlet port 22*c* of the flow passage 221. The refrigerant gas flowing in the flow passage 220 and the hot fluid flowing in the flow passage 221 flow counter to each other. The refrigerant enters the refrigerant inlet port 22*a* as a high-temperature, high-pressure gas and gradually heats the hot fluid that flows through the heat exchanger 22. The gaseous refrigerant condenses and flows out from the refrigerant outlet port 22*b*. Since the refrigerant and the hot fluid flow counter each other, the hot fluid entering from the hot fluid inlet port 22*c* is heated when flowing through the flow passage 221. As the hot fluid approaches the hot fluid outlet port 22*d*, the hot fluid is heated further by the high-temperature refrigerant that has entered from the refrigerant inlet port 22*a* and has not yet lost substantial heat. Thus, the performance of the heat exchanger is improved by arranging for the refrigerant to flow counter to the refrigerant with which heat is being exchanged.

Returning to FIG. 1, the electric heater 31 is disposed downstream of the heat exchanger 22. The electric heater 31 further heats the hot fluid heated by the heat exchanger 22 as necessary. Electric current supplied to electric heater 31 is controlled by, for example, a heater controller (not shown). Hence, the electric heater 31 generates heat that heats the hot fluid.

The fluid temperature sensor 32 is disposed near a downstream side of the electric heater 31. The fluid temperature sensor 32 detects a temperature of the hot fluid flowing through the heater hot fluid flow passage 30. The fluid temperature sensor 32 can be disposed near any one of the heat exchanger 22, the electric heater 31, and the heater core 33, or integrated with any one of these components. As mentioned previously, the heater core 33 is disposed inside the duct 10 in a position downstream of the evaporator 25 and the air mix damper 14. Hot fluid heated to a high temperature flows through an inside of the heater core 33 and exchanges heat with air flowing around the heater core 33. The air exiting the evaporator 25 has been cooled to a low temperature and, thus, removes heat from the hot fluid. The temperature of the air rises and the temperature of the hot fluid is lowered. The heated air is adjusted by the air mix damper 14 to mix with air that has not passed through the heater core 33. The mixed air is blown into the vehicle cabin through the discharge port 16. After releasing heat and falling to a lower temperature in the heater core 33, the hot fluid leaves the heater core 33 and flows toward the reserve tank 34.

The reserve tank 34 is disposed between the heater core 33 and the fluid pump 35. The reserve tank 34 serves a vapor-liquid separator and separates air and liquid that have flowed into the heater hot fluid flow passage 30. The reserve tank 34 is provided such that a liquid surface is aligned with or substantially aligned with an uppermost portion of the heater hot fluid flow passage 30. Separated air collects in the reserve tank 34, and only the liquid or substantially only the liquid is returned to the heater hot fluid flow passage 30.

The fluid pump 35 is disposed downstream of reserve tank 34. The fluid pump 35 pumps hot fluid flowing in from the reserve tank 34 to the heat exchanger 22 again such that the hot fluid circulates inside the heater hot fluid flow passage 30. The fluid pump 35 has an impeller (not shown) arranged inside and driven by a motor.

The flow passage selector valve 36 is disposed downstream of the fluid pump 35. The flow passage selector valve 36 is, for example, a three-way valve. The flow passage selector valve 36 has an inlet port 36*a* into which hot fluid flows from the fluid pump 35 through the heater hot fluid flow passage 30. The flow passage selector valve 36 further includes an outlet port 36*b* from which hot fluid flows to a downstream section of the heater hot fluid flow passage 30, and an outlet port 36*c* from which hot fluid flows to the communication flow passage 50*a* as explained below. The flow passage selector valve 36 is driven by, for example, a pulse width modulation (PWM) signal and the opening degree is set in accordance with a duty ratio of the PWM signal.

Figure 3A:
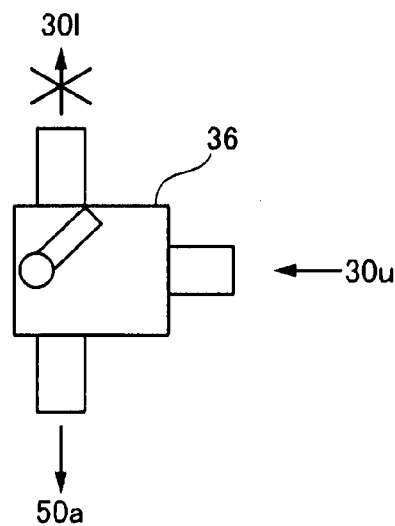
FIGS. 3A, 3B and 3C illustrate examples of operating states of a flow passage selector valve in the vehicle air conditioning system.

The flow passage selector valve 36 will now be explained with reference to FIGS. 3A to 3C which illustrate exemplary operating states of a flow passage selector valve. FIG. 3A shows a state in which the flow passage selector valve is fully open. In this state, the hot fluid from the heater hot fluid flow passage 30*u* does not flow downstream to the heater hot fluid flow passage 30*l*. Thus, all or substantially all of the hot fluid entering the flow passage selector valve 36 flows to the communication flow passage 50*a*. The hot fluid then flows through the communication flow passage 50*a* to an electrical component cooling flow passage 40 as explained later below.

Figure 3B:
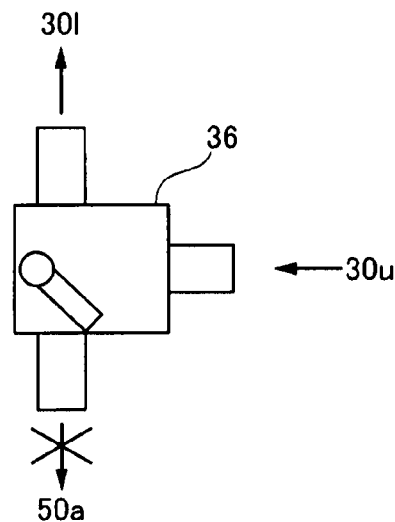

FIG. 3B shows a state in which the flow passage selector valve is fully closed. In this state, fluid from the heater hot fluid flow passage 30*u* flows directly to downstream to the heater hot fluid flow passage 30*l* and none or basically none of the hot fluid flows to the communication flow passage 50a. Thus, the heater hot fluid flow passage 30 and the electrical component cooling flow passage 40 become independent circulation passages.

Figure 3C:
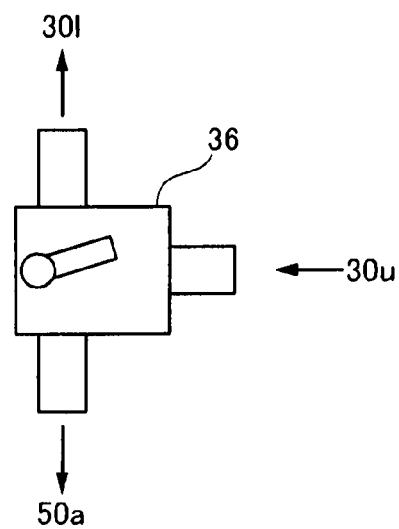

FIG. 3C shows a state in which the flow passage selector valve is opened to an opening degree of 70%. In this state, hot fluid from the heater hot fluid flow passage 30u is distributed to the communication flow passage 50a and to the downstream heater hot fluid flow passage 30l.

Thus, by opening and closing the flow passage selector valve 36, the amount of the hot fluid flowing from the heater hot fluid flow passage 30 to the electrical component cooling flow passage 40 can be adjusted. An opening degree control executed with respect to the flow selector valve 36 will be explained below.

As further shown in FIG. 1, the electrical component cooling flow passage 40 connects an electrical component 41, a radiator 42, a fluid temperature sensor 43, a reserve tank 44, and a fluid pump 45. A coolant flows through the electrical component flow passage 40 and undergoes temperature changes as it is circulated through the passage. An aqueous solution of ethylene glycol or other antifreeze can be used as the coolant.

The electrical component 41 can be, for example, a motor used to drive the vehicle, an inverter, a high-voltage battery, a DC/DC converter, or a charger. The electrical component 41 emits heat when electrically energized. Thus, the electrical component 41 can be cooled with the coolant in order to prevent the electrical component 41 from failing or undergoing a performance decline due to heat.

The radiator 42 is disposed downstream of the electric component 41. As understood in the art, the radiator 42 is typically arranged in a location where it is readily exposed to a traveling wind (moving air) when the vehicle moves forward. The coolant transfers heat from the electrical component 41 to the radiator 42. The heat is exchanged with air passing through the radiator 42 that includes air entering the radiator due to vehicle movement and cooling air that is blown through the radiator by a cooling fan 42a. As shown, the cooling fan 42a is attached to the radiator 42. Thus, the temperature of the coolant rises due to heat emitted from the electrical component 41, and the coolant is cooled to a temperature equal to or below a prescribed temperature in the radiator 42.

Although the radiator 42 is cooled by air when the vehicle is moving, there are times, such as during traffic congestion, when the radiator 42 cannot be sufficiently cooled by the outside air. In such situations, the cooling fan 42a is driven by a motor (not shown) to increase the amount of air flowing through the radiator 42 and cool the radiator 42.

A fluid sensor 43 is disposed on an outlet side of the radiator 42. The fluid temperature sensor 43 detects a temperature of the coolant flowing to the electrical component 41 from the radiator 42. The cooling fan 42a is driven when a temperature of the coolant detected by the coolant sensor 43 is equal to or above a prescribed temperature.

The reserve tank 44 is disposed downstream of the radiator 42. The reserve tank 44 serves a vapor-liquid separator and separates air and liquid that have flowed into the electrical component cooling flow passage 40. The reserve tank 44 is provided such that a liquid surface is aligned with or substantially aligned with an uppermost portion of the electrical component cooling flow passage 40. Separated air collects in the reserve tank 44 and only the liquid or substantially only the liquid is returned to the electrical component cooling flow passage 40. Also, the reserve tank 44 can be formed as an integral unit with the reserve tank 34 disposed in the heater hot fluid flow passage 30.

As further shown, the fluid pump 45 is disposed downstream of reserve tank 44. The fluid pump 45 pumps coolant flowing in from the reserve tank 44 to the electrical component 41 again such that the coolant circulates inside the electrical component cooling flow passage 40. The fluid pump 45 has an impeller (not shown) arranged inside and driven by a motor.

The communication flow passage 50 is disposed between the heater hot fluid flow passage 30 and the electrical component cooling flow passage 40 and serves to connect the two flow passages together. The communication flow passage 50 in this example comprises two flow passages, namely, a flow passage 50a and a flow passage 50b. One end of the communication flow passage 50 connects to the heater hot fluid flow passage 50 at the outlet port 50c of the flow passage selector valve 36. The electrical component cooling flow passage 40 includes a first end 40a and a second end 40b. The flow passage 50a is connected to the first end 40a of the electrical component cooling flow passage 40. The flow passage 50b is connected to the second end 40b of the electrical component cooling flow passage 40. The other end connects to the electrical component cooling flow passage 40 between the electrical component 41 and the radiator 42. One end of the communication flow passage 50b connects to the heater hot fluid flow passage 50 between the flow passage selector valve 36 and the heat exchanger 22. The other end of the communication flow passage 50b connects to the electrical component cooling flow passage 40 between the radiator 42 and the reserve tank 44. When the flow passage selector valve 36 is opened to the communication flow passage 50a, hot fluid from the heater hot fluid flow passage 30 flows into the communication flow passage 50a. The hot fluid flowing in mixes with the coolant in the electrical component cooling flow passage 40 and passes through the radiator 42 before returning to the heater hot fluid flow passage 30 through the communication flow passage 50b. The hot fluid flowing through the communication flow passage 50b has a lower temperature than the hot fluid flowing through the communication flow passage 50a.

The heater controller 100 controls the electric heater 31 and the flow passage selector valve 36 to control the temperature of the hot fluid flowing in the heater hot fluid flow passage 30. The heater controller 100 comprises, for example, a microcomputer having a central processing unit (CPU), a read only memory (ROM), a random access memory (RAM), and an input/output interface (I/O interface). The heater controller 100 can also comprise a plurality of microcomputers.

Figure 4:
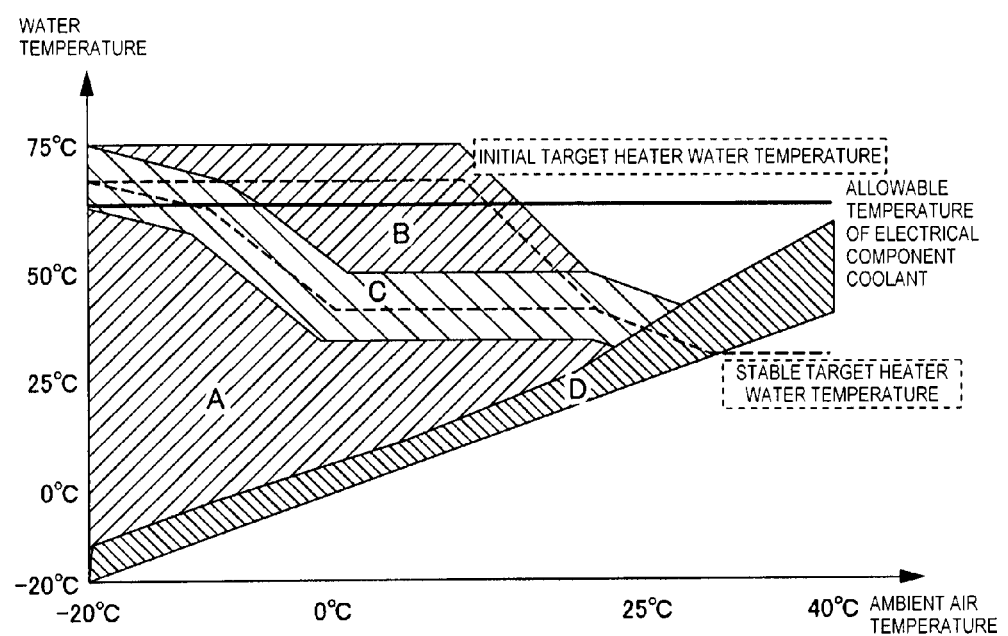
FIG. 4 is diagram illustrating an example of relationships between an ambient air temperature and fluid temperatures in the heater hot fluid flow passage and the electrical component cooling flow passage of the vehicle air conditioning system.

An example of the operation of the vehicle air conditioning system 1 will now be explained with reference to the graph in FIG. 4. FIG. 4 is diagram illustrating exemplary relationships between an ambient air temperature and fluid temperatures in the heater hot fluid flow passage and the electrical component cooling flow passage.

The vehicle air conditioning system 1 controls the electric heater 31 and the flow passage selector valve 36 such that the hot fluid flowing in the heater hot fluid flow passage 30 is held at or about a target temperature set based on a discharge air temperature. In this way, the vehicle air conditioning system 1 achieves a comfortable environment inside the vehicle cabin while reducing the amount of electric power consumed by the electric heater 31.

The horizontal axis of the graph in FIG. 4 indicates an outside ambient air temperature. The ambient air temperature is a temperature value detected by an ambient air temperature sensor (not shown) that can be provided in a position frontward of the radiator 42. The vertical axis indicates a temperature of the hot fluid flowing in the heater hot fluid flow passage 30 (hereinafter called heater fluid temperature) and a temperature of the coolant flowing in the electrical component cooling flow passage 40 (hereinafter called electrical component coolant temperature). The heater fluid temperature and the electrical component coolant temperature are values detected by fluid temperature sensors 32 and 43, respectively, provided in the flow passages.

Immediately or soon after the vehicle is started, the heater fluid temperature is the same or about the same as the ambient air temperature. The ambient air temperature and the heater fluid temperature are equal or substantially equal as indicated by the lower boundary line of region D. The heater fluid temperature increases in region A due to heat generated by the electric heater 31 and the heat exchanger 22. During a period immediately or soon after the vehicle is started, the vehicle is not traveling in a stable manner. Thus, the temperature inside the vehicle cabin is not stable. During this period, a target temperature of the heater fluid temperature is set to a value in region B. This target temperature of the heater fluid temperature is set as an initial target heater fluid temperature and an example is indicated with a dotted line in the graph. After a temperature inside the vehicle cabin stabilizes, the target heater fluid temperature is set to a value in region C. This target temperature of the heater fluid temperature is set as a stable target heater fluid temperature, and an example is indicated with a dotted line in the graph. Also, the electric component coolant temperature is equal to or substantially equal to the ambient air temperature immediately or soon after the vehicle is started. Therefore, a target temperature is set to a value in the region D. The electrical component coolant temperature is controlled based on an amount of heat emitted from the electrical component 41 and a wind speed of air flowing through the radiator 42, such that the electric component coolant temperature ultimately lies in the region D. The region D has a maximum width of 20 degrees or about 20 degrees from a lower boundary line (i.e., the ambient air temperature) and does not exceed a line indicating an allowable temperature of the coolant cooling the electrical component 41.

The heater fluid temperature stabilizes when an amount of heat radiated from the heater core 33 and an amount of heat emitted from the heat exchanger 22 and the electric heater 31 are equal. Then, the heater hot fluid flow passage 30 and the electrical component cooling flow passage 40 can be separated into independent circulation passages. When an amount of heat radiated from the heater core 33 is larger than an amount of heat emitted from the heat exchanger 22 and the electric heater 31 is large, the heater hot fluid flow passage 30 and the electrical component cooling flow passage 40 are separated from each other to adjust an amount of heat emitted from the electric heater 31. However, if the rotational speed of the compressor 31 increases and the amount of heat emitted from the heat exchanger 22 increases beyond the amount of heat radiated from the heater core 33, then the heater fluid temperature will continue to rise. In such a situation, the flow passage selector valve 36 is opened such that the heater hot fluid flow passage 30 and the electrical component cooling flow passage 40 are joined together. Since electrical component coolant having a lower temperature than the heater hot fluid flows into the heater hot fluid flow passage 30, the rising heater fluid temperature can be lowered. However, if a large amount of electrical component coolant is allowed to flow into the heater hot fluid flow passage 30, then the heater fluid temperature will decrease far below the target fluid temperature. If this occurs, the comfort of the cabin interior could be degraded and the electric current consumption could increase because the electric heater 31 will be driven to output heat in order to increase the heater fluid temperature. This phenomenon is particularly apparent when the ambient air temperature is low because the difference between the heater fluid temperature (region B or C) and the electrical component coolant temperature (region D) is large. Therefore, an opening degree of the flow passage selector valve 36 is set in accordance with a temperature difference between the heater fluid temperature and the electrical component coolant temperature.

Figure 5:
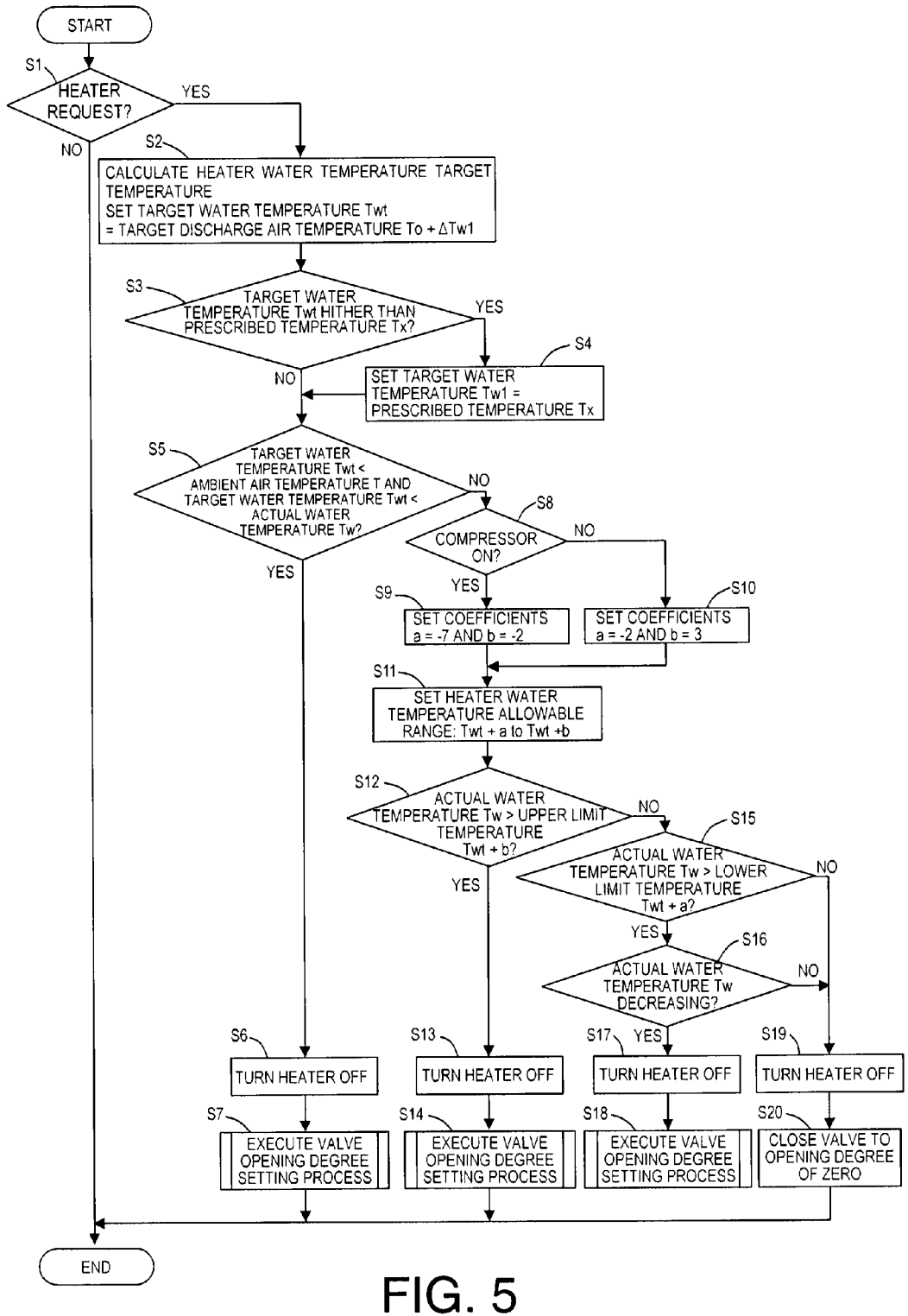
FIG. 5 is a flowchart for explaining an example of operations that can be performed by the vehicle air conditioning system.

An example of a process performed by a vehicle air conditioning system 1 will now be explained in detail with reference to the flowchart shown in FIG. 5. The vehicle air conditioning system 1 repeatedly executes the processing steps of the flowchart once per small cycle time (e.g., every 10 milliseconds or other suitable time period).

In step S1, the heater controller 100 determines if a heater request has occurred. A heater request constitutes a passenger turning a fan switch on. If a heater request exists, then the heater controller 100 processing proceeds to step S2. If a heater request does not exist, then the heater controller 100 processing ends the control sequence as indicated.

In step S2, the heater controller 100 calculates a target fluid temperature (Twt) for the heater fluid temperature. The target fluid temperature Twt is calculated in this example by adding a quantity $\Delta Tw1$ to a target discharge air temperature To. The target discharge air temperature To is a target temperature at an air conditioner discharge port inside the vehicle. The target discharge air temperature To is determined based on detection values from a plurality of sensors (e.g., an ambient air temperature sensor, a cabin interior temperature sensor, an outlet temperature sensor of the evaporator 25, and a solar radiation sensor) and a temperature setting value set by a passenger (e.g., a driver or passenger of the vehicle). The discharge air temperature is determined by mixing of air that has passed through the evaporator 25 and air that has passed through the heater core 33. Since a temperature of the hot fluid flowing in the heater core 33 is higher than the target discharge air temperature To by the quantity $\Delta Tw1$, the actual discharge air temperature becomes the target discharge air temperature To. In this example, the quantity $\Delta Tw1$ is preferably set to 5° C. or approximately 5° C.

In step S3, the heater controller 100 determines if the target fluid temperature Twt for the heater fluid temperature is higher than a prescribed temperature Tx. The prescribed temperature Tx is an upper limit value and is fixed. The target discharge air temperature To is calculated based on various parameters, and thus is sometimes calculated to be an abnormally high value. The prescribed temperature Tx is preferably a value of approximately 60 to 70° C. in order to maintain a comfortable environment inside the vehicle cabin while reducing the amount of electric power consumed by the electric heater. If the target fluid temperature Tw for the heater fluid temperature is higher than the prescribed temperature Tx, then the heater controller 100 processing proceeds to step S4. If the target fluid temperature Tw for the heater fluid temperature is equal to or lower than the prescribed temperature Tx, then the heater controller 100 processing proceeds to step S5.

In step S4, the heater controller 100 sets the target fluid temperature Twt for the heater fluid temperature to the prescribed value Tx. In step S5, the heater controller 100 determines if the target fluid temperature Twt for the heater fluid temperature is lower than an ambient air temperature T and lower than an actual heater fluid temperature Tw. If both conditions exist, then the heater controller 100 proceeds to step S6. If both conditions not exist, then the heater controller 100 proceeds to step S8.

In step S6, the heater controller 100 turns the electric heater 31 off. In step S7, the heater controller 100 executes an opening degree setting process with respect to the flow passage selector valve 36. The setting processing will be explained in detail later.

In step S8, which occurs if both conditions are determined not to exist in step S5, the heater controller 100 determines if the compressor 21 is on. The compressor 21 is driven when the air conditioner switch has been turned on by a passenger and there is a difference between a cabin interior temperature and the discharge air temperature, or when dehumidification is required during a heating mode. If the compressor 21 is on, then the heater controller 100 processing proceeds to step S9. If the compressor 21 is off, then the heater controller 100 processing proceeds to step S10.

In step S9, the heater controller 100 sets a coefficient a to −7 and a coefficient b to −2; and these coefficients serve to set an allowable range of the heater fluid temperature. The allowable range of the heater fluid temperature comprises threshold values used to turn the electric heater on and off based on the target fluid temperature Twt. The electric heater 31 is controlled such that the heater fluid temperature is held within the allowable range. However, in step S10, the heater controller 100 sets the coefficient a to −2 and the coefficient b to 3 (these coefficients serve to set the allowable range of the heater fluid temperature).

In step S11, the heater controller 100 sets a range within which the heater fluid temperature will be maintained by the electric heater 31. A lower limit temperature of the heater fluid temperature is set to a value obtained by adding the coefficient a to the target fluid temperature Twt. Also, an upper limit temperature is set to a value obtained by adding the coefficient b to the target fluid temperature Twt. The electric heater 31 turns on when the heater fluid temperature falls below the lower limit temperature Twt+a and turns off when the heater fluid temperature rises above the upper limit temperature Twt+b. The coefficients a and b can be calculated by determining experimentally heater fluid temperatures at which a cabin interior temperature can be maintained in a stable fashion. When the compressor 21 is running, the temperature region maintained by the electric heater 31 decreases because heating takes place in the heat exchanger 22 as well as the electric heater 31.

In step S12, the heater controller 100 determines if an actual heater fluid temperature Tw is higher than the upper limit temperature Tw+b. If the actual heater fluid temperature is higher than the upper limit temperature, then the heater controller 100 processing proceeds to step S13. If the actual heater fluid temperature is equal to or lower than the upper limit temperature, then the heater controller 100 processing proceeds to step S15.

In step S13, the heater controller 100 turns the electric heater 31 off. In step S14, the heater controller 100 executes an opening degree setting process with respect to the flow passage selector valve 36.

On the other hand, in step S15, the heater controller 100 determines if the actual heater fluid temperature Tw is higher than the lower limit temperature Twt+a. If the actual heater fluid temperature is higher than the lower limit temperature, then the heater controller 100 proceeds to step S16. If the actual heater fluid temperature is equal to or lower than the lower limit temperature, then the heater controller 100 processing proceeds to step S19.

In step S16, the heater controller 100 determines if the heater fluid temperature Tw is decreasing. If the heater fluid temperature Tw is decreasing, then the heater controller 100 processing proceeds to step S17. If the heater fluid temperature Tw is increasing, then the heater controller 100 processing proceeds to step S19. Also, the processing can determine if the electric heater 31 is off instead of determining if the heater fluid temperature Tw is decreasing.

In step S17, the heater controller 100 turns the electric heater 31 off. In step S18, the heater controller 100 executes an opening degree setting process with respect to the flow passage selector valve 36.

However, in step S19, the heater controller 100 turns the electric heater 31 on. In step S20, the heater controller 100 closes the flow passage selector valve 36 completely.

The valve opening degree setting process executed with respect to the flow passage selector valve 36 in steps S7, S14, and S18 will now be explained with reference to the flowchart shown in FIG. 6.

In step S100, the heater controller 100 sets a heater fluid temperature valve allowable range. The heater fluid temperature valve allowable range comprises a lower limit temperature equal to the target fluid temperature Twt and an upper limit temperature equal to the sum of the target fluid temperature Twt and a quantity $\Delta Tw2$. The valve allowable range is a range of heater fluid temperatures that is maintained by the flow passage selector valve 36. The flow passage selector valve 36 opens when the heater fluid temperature exceeds the upper limit temperature Twt+$\Delta Tw2$ and closes when the heater fluid temperature returns to the lower limit temperature Twt. In this example, the quantity $\Delta Tw2$ is preferably set to 3° C. or approximately 3° C.

In step S101, the heater controller 100 determines if an actual heater fluid temperature Tw is higher than the upper limit temperature Twt+$\Delta Tw2$. If the actual heater fluid temperature is higher than the upper limit temperature, then the heater controller 100 processing proceeds to step S102. If the actual heater fluid temperature is equal to or lower than the upper limit temperature, then the heater controller 100 processing proceeds to step S103.

In step S102, the heater controller 100 sets an opening degree of the flow passage selector valve 36 based on a map. The processing executed in this step will be explained in detail later. However, in step S103, the heater controller 100 determines if an actual heater fluid temperature Tw is higher than the lower limit temperature Twt. If the actual heater fluid temperature is higher than the lower limit temperature, then the heater controller 100 processing proceeds to step S104. If the actual heater fluid temperature is equal to or lower than the lower limit temperature, then the heater controller 100 processing proceeds to step S107.

In step S104, the heater controller 100 determines if the heater fluid temperature Tw is decreasing. If the heater fluid temperature Tw is decreasing, then the heater controller 100 processing proceeds to step S105. If the heater fluid temperature Tw is increasing, then the heater controller 100 processing proceeds to step S106. Also, the processing can determine if the electric heater 31 is off instead of determining if the heater fluid temperature Tw is decreasing.

In step S105, the heater controller 100 sets an opening degree of the flow passage selector valve 36 based on, for example, a map of values. In step S106, the heater controller 100 sets the opening degree of the flow passage selector valve 36 to zero. The hot fluid flowing in the heater hot fluid flow passage 30 does not flow to the electrical component cooling flow passage 40. Thus, the heater hot fluid flow passage 30 and the electrical component cooling flow passage 40 become independent flow passages. In step S107, the heater controller 100 sets the opening degree of the flow passage selector valve 36 to zero.

Figure 7:
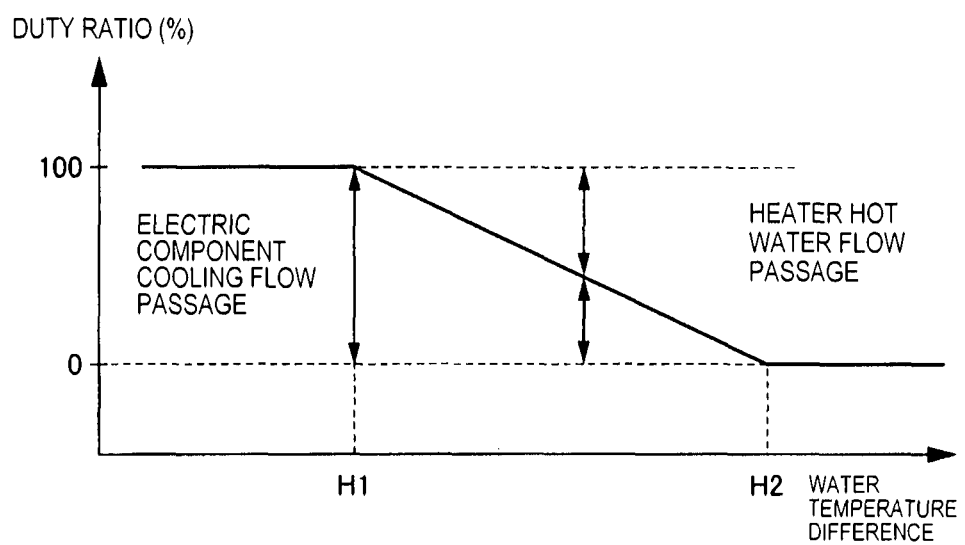
FIG. 7 is a graph illustrating examples of a degree of opening for the flow passage selector valve of the vehicle air conditioning system.

An opening degree map used to set the opening degree of the flow passage selector valve 36 in steps S102 and S105 will now be explained with reference to FIG. 7. The horizontal axis indicates a fluid temperature difference obtained by subtracting the electrical component cooling fluid temperature Th from the heater fluid temperature Tw. The vertical axis represents a duty ratio of the flow passage selector valve 36. The flow passage selector valve 36 is considered to have an opening degree of zero when heater hot fluid does not flow from the heater hot fluid flow passage 30 to the electrical component cooling flow passage 40, and the two flow passages are isolated from each other. The duty ratio of the flow passage selector valve 36 is a distribution ratio of heater hot fluid allowed to flow from the heater hot fluid flow passage 30 to the electrical component cooling flow passage 40 and corresponds to a valve opening degree.

If the fluid temperature difference between the heater fluid temperature Tw and the electrical component cooling fluid temperature Th is small, then the temperature of the heater hot fluid will not decrease suddenly even if the valve opening degree is set to 100% and electrical component coolant is allowed to flow into the heater hot fluid flow passage 30. When the fluid temperature difference is larger, the temperature of the heater hot fluid can be prevented from declining suddenly by setting the valve opening degree to a smaller value and allowing the electrical component coolant to flow into the heater hot fluid flow passage 30 more gradually. The valve opening degree is set to zero when the fluid temperature difference is equal to or larger than a prescribed value H2, and the valve opening degree set to 100% when the fluid temperature difference is equal to or smaller than a prescribed value H1. By adjusting the opening degree of the flow passage selector valve 36 according to the fluid temperature difference, a situation in which the heater fluid temperature decreases suddenly and must be raised by the electric heater 31 can be avoided, thus preventing wasteful use of the electric heater.

Figure 8:
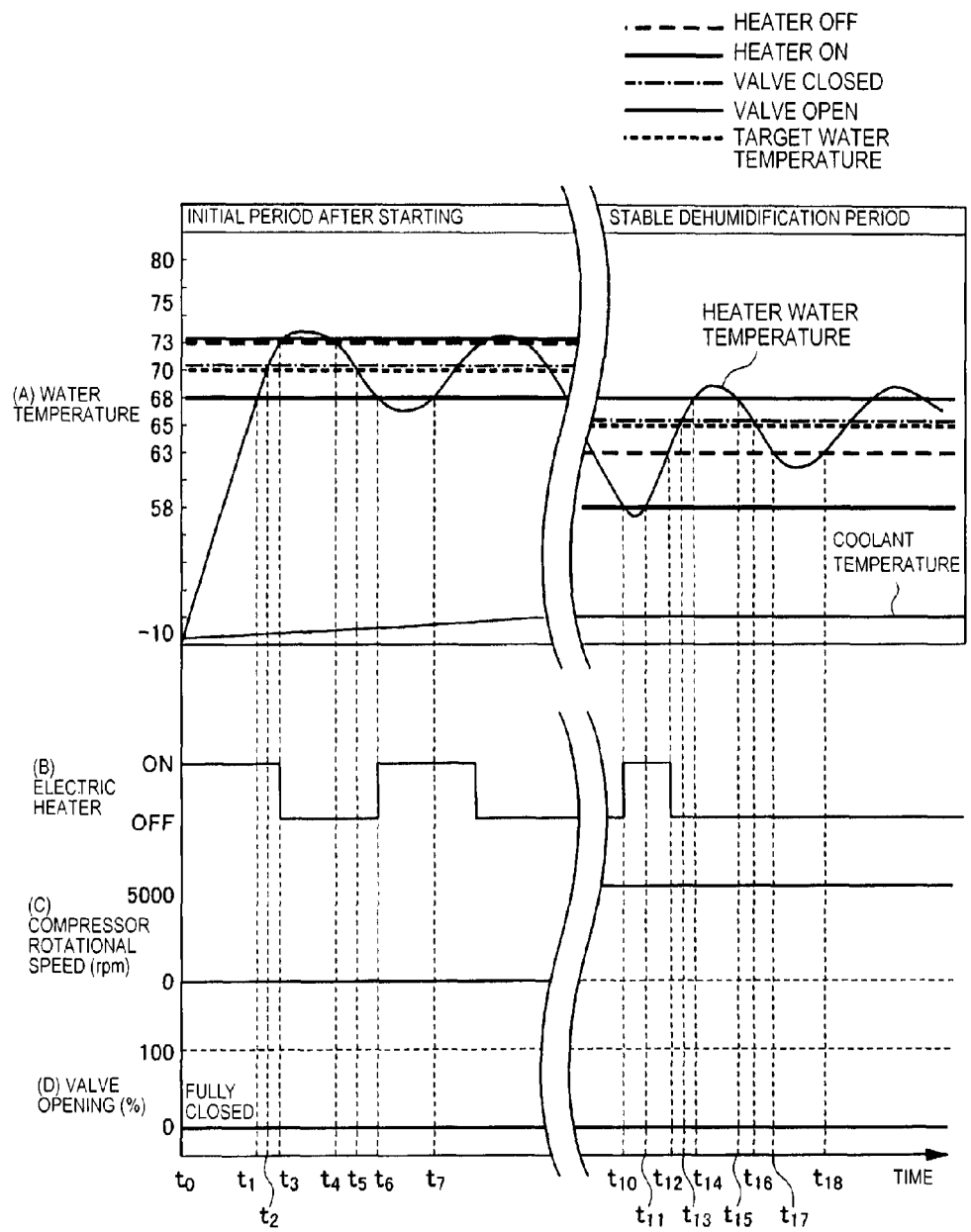
FIG. 8 is a timing diagram illustrating conditions of features of the vehicle air conditioning system when an ambient air temperature is at or about −10° C.

A control executed by a vehicle air conditioning system 1 according to this example during different ambient air temperatures will now be explained with reference to FIGS. 8 to 10. FIG. 8 is an exemplary timing chart illustrating a control executed when an ambient air temperature is −10° C. Although the target fluid temperature for the heater fluid temperature and other quantities are expressed with specific numerical values, these temperatures and quantities can have any suitable values.

At a time t0 in FIG. 8, a request for heating is issued by a driver (a "Yes" condition in step S1). At this time, the heater fluid temperature and the electrical component cooling fluid temperature are the same as the ambient air temperature at −10° C. An initial target fluid temperature for the heater fluid temperature is set to 70° C. (steps S2 and S3). Since the target fluid temperature is higher than the ambient air temperature (a "No" condition in step S5) and the compressor 21 is not running (portion (C) of FIG. 8, and a "No" condition in step S8), the heater fluid temperature allowable range is 68 to 73° C. (portion (A) of FIG. 8, and steps S10 and S11). Since the turbine fluid temperature is the same as the ambient air temperature at −10° C. (portion (A) of FIG. 8, and a "No" condition in steps S12 and S15), the electric heater 31 turns on and heats the hot fluid in the heater hot fluid flow passage 30 (portion (B) of FIG. 8, and step S19). Since the flow passage selector valve 36 is set to a closed state (portion (D) of FIG. 8, and step S20) when the electric heater 31 is on, the temperature of the hot fluid in heater hot fluid flow passage 30 is rises and the temperature of the coolant in the electrical component cooling flow passage 40 undergoes substantially no temperature rise (portion (A) of FIG. 8). At a time t1, the vehicle air conditioning system 1 repeats the processing in steps S1, S2, S3, S5, S8, S10, S11, S12, S15, S19 and S20 as discussed above.

At the time t1, the heater fluid temperature exceeds a lower limit temperature, such as 68° C., of the allowable range (portion (A) of FIG. 8, steps S12 and S15, and a "Yes" condition in step S15). Since the heater fluid temperature is rising (portion (A) of FIG. 8, and a "No" condition in step S16), the electric heater 31 remains on and heats the hot fluid in the heater hot fluid flow passage 30 (portions (B) and (D) of FIG. 8, and steps S19 and S20). At a time t2, the vehicle air conditioning system 1 repeats the processing in steps S1, S2, S3, S5, S8, S10, S11, S12, S15, S16, S19 and S20 as discussed above.

At the time t2, the heater fluid temperature exceeds a target fluid temperature of, for example, 70° C. (portion (A) of FIG. 8, steps S12 and S15, and a "Yes" condition in step S15). Similarly to the period from the time t1 to the time t2, the electric heater 31 is on and the heater fluid temperature is rising (portions (A) and (B) of FIG. 8, steps S15, S16 and S19). The flow passage selector valve 36 is closed (step S20). At a time t3, the vehicle air conditioning system 1 repeats the processing in steps S1, S2, S3, S5, S8, S10, S11, S12, S15, S16, S19 and S20.

At the time t3, the heater fluid temperature exceeds an upper limit temperature, 73° C., of the allowable range (portion (A) of FIG. 8, and a "Yes" condition in step S12). The electric heater 31 is turned off such that heating of the hot fluid in the heater hot fluid flow passage 30 is stopped (portion (B) of FIG. 8, and step S13). Also, the opening degree of the flow passage selector valve 36 is set in order to reduce the heater fluid temperature, which has become too high. Since the fluid temperature difference between the heater fluid temperature and the electrical component coolant temperature is large, the opening degree of the flow passage selector valve 36 is set to 0% such that the valve is fully closed (portion (D) of FIG. 8, and step S14). At a time t4, the vehicle air conditioning system 1 repeats the processing step sequence S1, S2, S3, S5, S8, S10, S11, S12, S13 and S14 (steps S100, S101 and S102).

Figure 6:
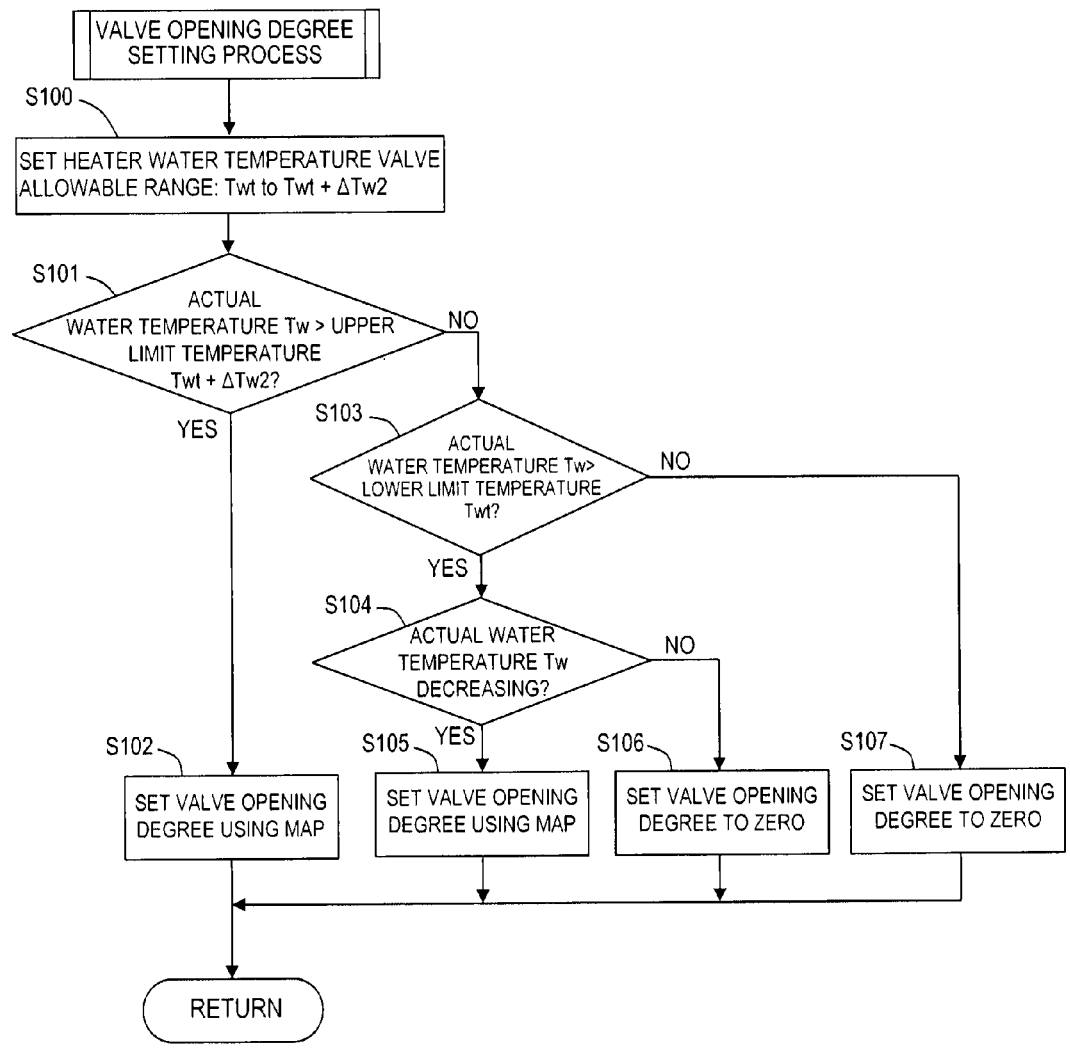
FIG. 6 is a flowchart illustrating an example of operations for an opening degree setting process that can be performed by the vehicle air conditioning system with respect to the flow passage selector valve.

In FIG. 6, the heater fluid temperature valve allowable range is set to 70° C. to 73° C. with the quantity ΔTw3 at 3° C. (portion (A) of FIG. 8, and step S100). Since the heater fluid temperature exceeded 73° C. at the time t3 (portion (A) of FIG. 8, and a "Yes" condition in step S101), the opening degree of the flow passage selector valve 36 is set using a map shown in FIG. 7 (step S102). In FIG. 7, the fluid temperature difference H2 is 50° C. If the flow passage selector valve 36 is opened when the difference (fluid temperature difference) between the heater fluid temperature and the electrical component coolant temperature is equal to or higher than 50° C., then the heater fluid temperature will decrease rapidly. Therefore, when the fluid temperature difference is equal to or higher than 50° C., the flow passage selector valve 36 is not operated and remains in a closed state.

At time t1, the heater fluid temperature falls below the upper limit temperature, 73° C., of the allowable range (portion (A) of FIG. 8, steps S12 and S15, a "Yes" condition in step S15, steps S101 and S103, and a "Yes" condition in step S103). At this time, the electric heater 31 is OFF and the heater fluid temperature gradually declines, i.e., is decreasing (a "Yes" condition in step S16). Since the electric heater 31 remains off, the fluid temperature difference is large, and the heater fluid temperature decreasing, the flow passage selector valve 36 continues to be set to a closed state (portions (B) and (D) of FIG. 8, and steps S17 and S18). At a time t5, the vehicle air conditioning system 1 repeats the processing of steps S1, S2, S3, S5, S8, S10, S11, S12, S15, S16, S17 and S18 (steps S100, S101, S103, S104 and S105).

At the time t5, the heater fluid temperature falls below the target heater fluid temperature, i.e., the lower limit temperature of 70° C. (portion (A) of FIG. 8, steps S101 and S103, and a "No" condition in step S3). Since the heater fluid temperature has reached the target fluid temperature and does not need to be lowered further, the flow passage selector valve 36 is set to a closed state (portion (D) of FIG. 8, and step S107). At a time t6, the vehicle air conditioning system 1 repeats the processing in steps S1, S2, S3, S5, S8, S10, S11, S12, S15, S16, S17 and S18 (S100, S101, S103 and S107).

At the time t6, the heater fluid temperature falls below the lower limit temperature, 68° C., of the allowable range (portion (A) of FIG. 8, steps S12 and S15, and a "No" condition in step S15). Therefore, the electric heater 31 is turned on to raise the heater fluid temperature (portion (B) of FIG. 8, and step S19). When the electric heater 31 is turned on, the flow passage selector valve 36 is set to a closed state because opening it would counteract the heating effect (portion (D) of FIG. 8, and step S20). At a time t7, the vehicle air conditioning system 1 repeats the processing in steps S1, S2, S3, S5, S8, S10, S11, S12, S15, S19 and S20.

At the time t7, the heater fluid temperature exceeds the lower limit temperature, 68° C., of the allowable range (portion (A) of FIG. 8, and a "Yes" condition in step S15). At the time t7, a similar state exists as existed at the time t1. Thereafter, the temperature variation of the heater hot fluid repeats the pattern exhibited during the period from the time t1 to the time t7.

A control executed when a temperature inside the vehicle cabin has stabilized will now be explained. An stable target fluid temperature for the heater fluid temperature is set to 65° C. (steps S2, S3 and S5, and a "No" condition in step S5). Dehumidification is conducted because the humidity inside the vehicle cabin has increased due to operation in a heating mode in which interior air is recirculated. Thus, the compressor 21 is operated (portion (C) of FIG. 8, and a "Yes" condition in step S8). When the compressor 21 is operated, the hot fluid flowing in the heater hot fluid flow passage 30 is heated in the heat exchanger 22 by a heat of condensation of the high-pressure, high-temperature refrigerant gas flowing in the air conditioning cooling flow passage 20. A temperature region within which the heater fluid temperature is maintained by the electric heater 31 is lowered in view of an amount by which the heater hot fluid is heated in the heat exchanger 22. A heater fluid temperature allowable range is set to 58° C. to 63° C. (portion (A) of FIG. 8, and steps S9 and S11). Also, a valve allowable range of the flow passage selector valve 36 is set to 65 to 68° C. (portion (A) of FIG. 8, step S100).

At a time t10, the heater fluid temperature falls below the lower limit temperature of 58° C. (portion (A) of FIG. 8, steps S12 and S15, and a "No" condition in S15) and the electric heater 31 is turned on (portion (B) of FIG. 8, and step S19). Meanwhile, the flow passage selector valve 36 is closed (portion (D) of FIG. 8, and step S20). At a time t11, the vehicle air conditioning system 1 repeats the processing in steps S1, S2, S3, S5, S8, S9, S11, S12, S15, S19 and S20.

At the time t11, the heater fluid temperature exceeds the lower limit temperature of 58° C. (portion (A) of FIG. 8, steps S12 and S15, and a "Yes" condition in S15). The electric heater 31 is on and the heater fluid temperature is rising (portion (A) of FIG. 8 and (B), and a "No" condition in step S16 and S19). Meanwhile, the flow passage selector valve 36 is closed (portion (D) of FIG. 8, and step S20). At a time t12, the vehicle air conditioning system 1 repeats the processing in steps S1, S2, S3, S5, S8, S9, S11, S12, S15, S16, S19 S20.

At the time t12, the heater fluid temperature exceeds the upper limit temperature of 63° C. (portion (A) of FIG. 8, and a "Yes" condition in step S12) and the electric heater 31 is turned off (portion (B) of FIG. 8, and step S13). The heater fluid temperature has not reached the lower limit temperature 65° C. of the valve allowable range and the flow passage selector valve is in a closed state (portion (D) of FIG. 8, and steps S14, S101, S103 and S107). At a time t13, the vehicle air conditioning system 1 repeats the processing in steps S1, S2, S3, S5, S8, S9, S11, S12, S13, S14 (steps S100, S101, S103 and S107).

At the time t13, the heater fluid temperature rises beyond a target fluid temperature (the lower limit temperature of the valve allowable range) of 65° C. (portion (A) of FIG. 8, and a "Yes" condition in step S12). The electric heater 31 remains off and the flow passage selector valve 36 remains in a closed state (portions (B) and (D) of FIG. 8, and steps S13, S14, S101, S103, S104 and S106). At a time t14, the vehicle air conditioning system 1 repeats the processing in steps S1, S2, S3, S5, S8, S9, S11, S12, S13 and S14 (steps S100, S101, S103, S104 and S106).

At the time t14, the heater fluid temperature exceeds an upper limit temperature, 68° C., of the valve allowable range (portion (A) of FIG. 8, and a "Yes" condition in step S12) and the electric heater 31 is off (portion (B) of FIG. 8, and step S13). Although the opening degree of the flow passage selector valve 36 is set using a map, the flow passage selector valve 36 remains in a closed state because the fluid temperature difference, i.e., the difference between the heater fluid temperature and the electrical component coolant temperature, is large (portion (D) of FIG. 8, and steps S14, S101 and S102). At a time t15, the vehicle air conditioning system 1 repeats the processing in steps S1, S2, S3, S5, S8, S9, S11, S12, S13 and S14 (steps S100, S101 and S102).

At the time t15, the heater fluid temperature falls below the upper limit temperature, 68° C., of the valve allowable range (portion (A) of FIG. 8, and a "Yes" condition in step S12) and the electric heater 31 is off (portion (B) of FIG. 8, and step S13). Although the opening degree of the flow passage selector valve 36 is set using a map, the flow passage selector valve 36 remains in a closed state because the fluid temperature difference, i.e., the difference between the heater fluid temperature and the electrical component coolant temperature, is large (portion (D) of FIG. 8, and steps S14, S101, S103, S104 and S105). At a time t16, the vehicle air conditioning system 1 repeats the processing in steps S1, S2, S3, S5, S8, S9, S11, S12, S13 and S14 (steps S100, S101, S103, S104 and S105).

At the time t16, the heater fluid temperature falls below a target fluid temperature (the lower limit temperature of the valve allowable range) of 65° C. (portion (A) of FIG. 8, and a "Yes" condition in step S12) and the electric heater 31 is off (portion (B) of FIG. 8, and step S13). The flow passage selector valve 36 is in a closed state (portion (D) of FIG. 8, and steps S14, S101, S103 and S107). At a time t17, the vehicle air conditioning system 1 repeats the processing in steps S1, S2, S3, S5, S8, S9, S11, S12, S13 and S14 (steps S100, S101, S103 and S107).

At the time t17, the heater fluid temperature falls below the upper limit temperature, 63° C., of the allowable range (portion (A) of FIG. 8, and steps S12, S15 and S16, and a "Yes" condition in step S16) and the electric heater 31 is off (portion (B) of FIG. 8, and step S17). Although the opening degree of the flow passage selector valve 36 is set using a map, the flow passage selector valve 36 remains in a closed state because the fluid temperature difference, i.e., the difference between the heater fluid temperature and the electrical component coolant temperature, is large (portion (D) of FIG. 8, and steps S18, S101, S103, S104 and S105). At a time t18, the vehicle air conditioning system 1 repeats the processing in steps S1, S2, S3, S5, S8, S9, S11, S12, S15, S16, S17 and S18 (steps S100, S101, S103, S104 and S105).

At the time t18, the heater fluid temperature exceeds 63° C. again (portion (A) of FIG. 8, and a "Yes" condition in step S12) the electric heater 31 is off (portion (B) of FIG. 8, and step S13). The flow passage selector valve 36 is in a closed state (portion (D) of FIG. 8, and steps S14, S101, S103 and S107). At the time t18, a similar state exists as existed at the time t12. Thereafter, the temperature variation of the heater hot fluid repeats the pattern exhibited during the period from the time t12 to the time t18.

When the ambient air temperature is −10° C., the electrical component coolant temperature resides in a region quite a bit lower than the heater fluid temperature. As explained previously, the valve opening degree setting process (steps S7, S14 and S18) sets the flow passage selector valve 36 to a closed state because the fluid temperature difference is 50° C. However, it is also possible to lower the heater fluid temperature by adjusting the opening degree to a small value and restricting the amount of flow from the electrical component cooling flow passage 40.

Figure 9:
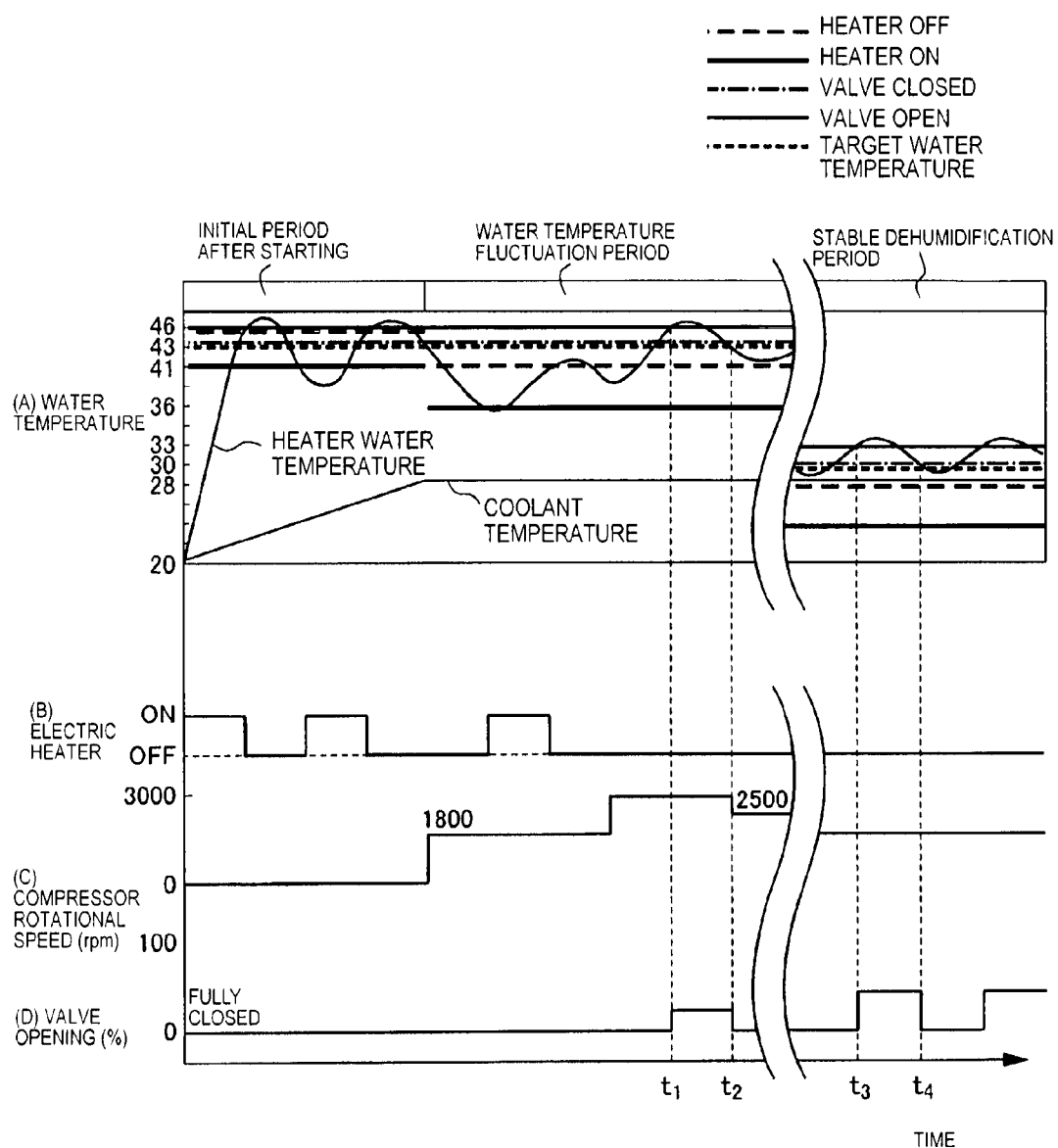
FIG. 9 is a timing diagram illustrating conditions of features of the vehicle air conditioning system when an ambient air temperature is at or about 20° C.

FIG. 9 is a time chart explaining a control executed when an ambient air temperature is 20° C. The initial target fluid temperature for the heater fluid temperature is set to 43° C. and the stable target fluid temperature is set to 30° C. The target fluid temperatures are different than when the ambient air temperature is −10° C., but the control flow is the same in an initial stage after the vehicle is started. During a fluid temperature fluctuation period and a stable dehumidification period, the control flow is the same as the stable dehumidification period in a case where the ambient air temperature is −10° C. However, when the ambient air temperature is 20° C., the valve opening degree setting process (steps S7, S14, and S18) executed with respect to the flow passage selector valve 36 opens the flow passage selector valve 36 to maintain the heater fluid temperature (portions (A) and (D) of FIG. 9). The compressor 21 runs during the fluid temperature fluctuation period and the stable dehumidification period, and the heater fluid temperature increases when the rotational speed of the compressor 21 increases (portion (C) of FIG. 9).

At a time t1 during the fluid temperature fluctuation period, the heater fluid temperature exceeds an upper limit temperature, 46° C., of a valve allowable range (portion (A) of FIG. 9). When this occurs, the vehicle air conditioning system 1 executes the processing in steps S1, S2, S3, S5, S8, S9, S11, S12, S13 and S14 and the processing in steps S100, S101 and S102 of the valve opening degree setting process. The valve opening degree is set based on the map shown in FIG. 7. When the ambient air temperature is 20° C., the electrical component cooling fluid temperature starts rising from 20° C. and is approximately 28° C. during the fluid temperature fluctuation period (portion (A) of FIG. 9). Since the difference (fluid temperature difference) between the heater fluid temperature and the electrical component coolant temperature is not large like when the ambient air temperature is −10° C., the valve opening degree is set to 20%. Thus, coolant from the electrical component cooling flow passage 40 is allowed to flow into the heater hot fluid flow passage 30 and lower the heater fluid temperature (portion (D) of FIG. 9). At a time t2, the valve opening degree is returned to zero because the heater fluid temperature reaches a target fluid temperature, i.e., a lower limit temperature, 43° C., of the valve allowable range (portions (A) and (D) of FIG. 9).

At a time t3 during the stable dehumidification period, the heater fluid temperature exceeds an upper limit temperature, 33° C., of a valve allowable range (portion (A) of FIG. 9). When this occurs, similarly to the time t1, the vehicle air conditioning system 1 executes the processing in steps S1, S2, S3, S5, S8, S9, S11, S12, S13 and S14 and the processing in steps S100, S101 and S102 of the valve opening degree setting process. At this time, fluid temperature difference, i.e., the difference between the heater fluid temperature and the electrical component coolant temperature, is even smaller (portion (A) of FIG. 9). Therefore, the valve opening degree is set to 40% such that coolant from the electrical component cooling flow passage 40 is allowed to flow into the heater hot fluid flow passage 30 and lower the heater fluid temperature (portion (D) of FIG. 9). At a time t4, the valve opening degree is returned to zero because the heater fluid temperature has reached a target fluid temperature, i.e., a lower limit temperature, 30° C., of the valve allowable range (portions (A) and (D) of FIG. 9).

Figure 10:
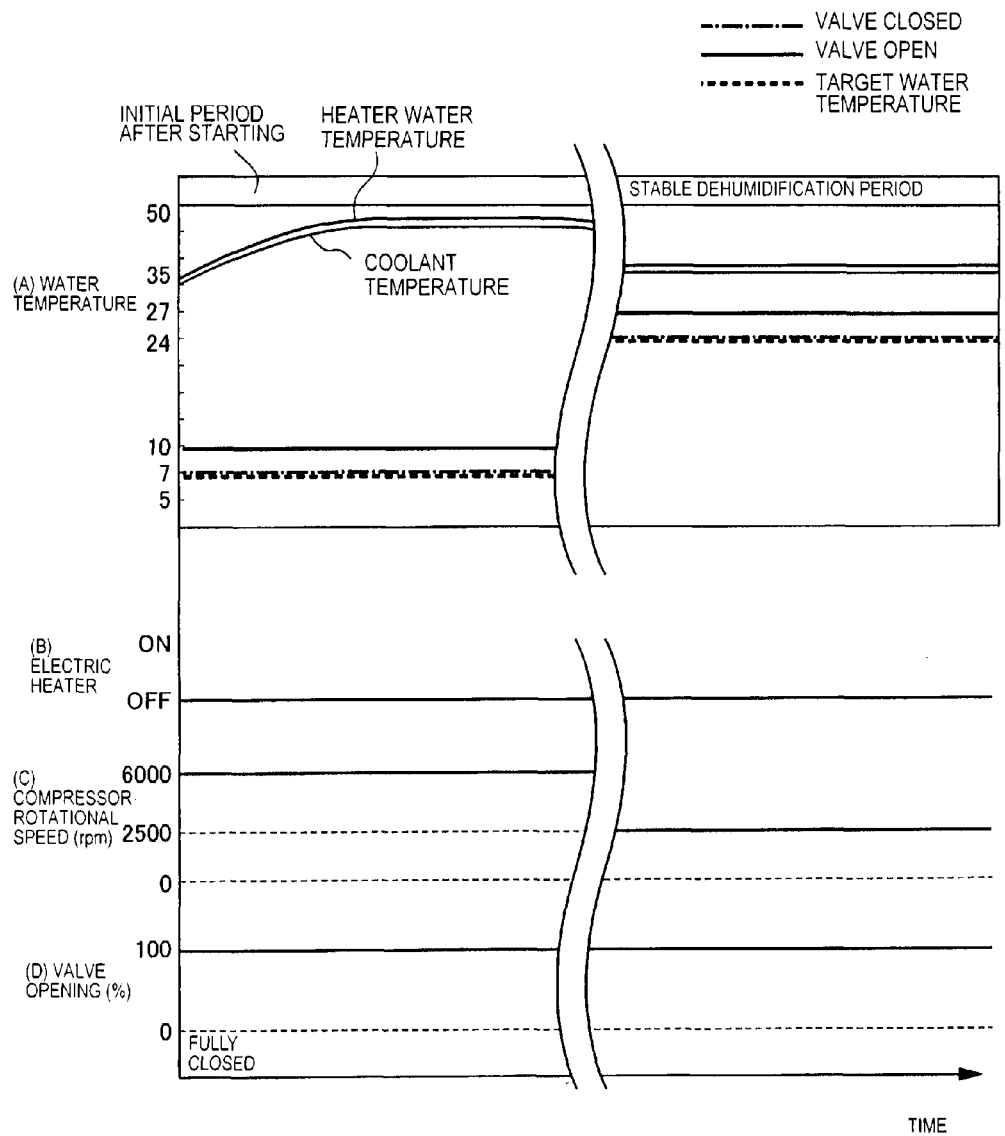
FIG. 10 is a timing diagram illustrating conditions of features of the vehicle air conditioning system when an ambient air temperature is 35° C.

FIG. 10 is a time chart explaining a control executed when an ambient air temperature is 35° C. The initial target fluid temperature for the heater fluid temperature is set to 7° C. and the stable target fluid temperature is set to 24° C. At this point, the initial target fluid temperature and the stable target fluid temperature are both lower than the ambient air temperature, 35° C. Since the heater fluid temperature starts from the same 35° C. as the ambient air temperature, the initial target fluid temperature and the stable target fluid temperature are both lower than the heater fluid temperature (portion (A) of FIG. 10, steps S1, S2, S3 and S5, and a "Yes" condition in step S5). Thus, since it is not necessary to increase the heater fluid temperature, the electric heater 31 is turned off (portion (B) of FIG. 10, and step S6). This control assumes the system is operating in a heating mode with a low temperature setting, e.g., 18° C. Therefore, when the compressor 21 is initially started, it is operated at a maximum rotational speed to cool the air delivered into the vehicle cabin. When the temperature stabilizes, the compressor 21 is operated at approximately half of the maximum rotational speed (portion (C) of FIG. 10). Also, the flow passage selector valve 36 remains fully open constantly because there is little difference between the heater fluid temperature and the electrical component coolant temperature and it is necessary to use the radiator 42 to release heat imparted to the heater hot fluid in the heater hot fluid flow passage 30 at the heat exchanger 22 (portion (D) of FIG. 10, and steps S7, S100, S101 and S102).

In this example, a fluid-cooled heat exchanger (22) is provided to exchange heat between an air conditioning cooling flow passage (20) and a heater fluid flow passage (30). When dehumidification is conducted due to operating in a heating mode in which interior air is recirculated, the compressor (21) of the air conditioning cooling flow passage

(20) is driven and high-pressure, high-temperature refrigerant gas flows through the heat exchanger (22) and heats the hot fluid in the heater hot fluid flow passage (30). Thus, the amount of electric power consumed by the electric heater (31) of the heater hot fluid flow passage (30) can be reduced not only by using inside air instead of outside air but also by utilizing heat of condensation received at the heat exchanger (22).

The electric heater (31) is controlled to contribute the minimum amount possible to the temperature increase of the heater hot fluid in view of the fluid temperature increase accomplished by the heat exchanger (22). Thus, using the heat exchanger (22) to exchange heat for dehumidification can avoid a situation in which the heater hot fluid temperature becomes too high and it becomes difficult to transfer a sufficient amount of heat so that the dehumidification rate declines. Instead, the required dehumidification rate can be maintained and heating can be accomplished while reducing the electric power consumption. Furthermore, since the refrigerant flowing in the air conditioning refrigerant flow passage can be held at a high condensation temperature in the heat exchanger (22), a sufficient amount of refrigerant can circulate in the flow passage. This can insure that sufficient heating can be performed when the ambient air temperature is low without using a combustion heater as a supplemental heat source.

In addition, when the heater fluid temperature becomes higher than necessary, the flow passage selector valve (36) is opened such that coolant from the electrical component cooling flow passage flows (40) into the heater hot fluid flow passage (30) and lowers the heater fluid temperature. An opening degree of the flow passage selector valve (36) is adjusted in accordance with a fluid temperature difference between the two flow passages such that the heater fluid temperature does not decline abruptly. This can prevent the wasteful use of the electric heater (31) to raise the heater fluid temperature after the temperature has abruptly declined. Accordingly, the amount of electric power consumed by the electric heater can be reduced because use of the electric heater can be minimum or at least reduced.

In addition, the electrical component(s) in the electrical component cooling flow passage 50a is arranged to be parallel to the heater hot fluid flow passage 30. Therefore, when the ambient air temperature is low, a situation in which the electrical component is warmed by heat from the heater hot fluid flow passage (30) and wasteful electric power consumption increases does not occur. The amount of electric power consumed by the electric heater (31) can be held to a minimum or at least reduced.

Furthermore, the flow passage selector valve (36) is opened when an amount of heat generated at the heat exchanger (22) is larger than an amount of heat emitted from the heater core (33) and the heater fluid temperature becomes too high. In such a case, the surplus heat from the heat exchanger (22) is discharged from the radiator of the electrical component cooling flow passage (40). Consequently, it is not necessary to provide a separate exterior heat exchanger outside the vehicle cabin for cooling. As a result, simply the radiator can be arranged in a front end portion of the vehicle, and the performance of the radiator is not degraded due to heat discharged from another exterior heat exchanger.

Also, when the ambient air temperature is high, the temperature of the coolant in the electrical component cooling flow passage (40) is sometimes higher than the temperature of the hot fluid in the heater hot fluid flow passage (30). When this occurs, the flow passage selector valve (36) is opened fully such that heat generated at the heat exchanger can be discharged from the radiator (42). Therefore, the capacity of the radiator (42) is generally designed in consideration of a maximum amount of heat generated by an onboard electrical component and a maximum amount of heat generated at the heat exchanger (22). However, in this example, the electrical component and the heater hot fluid flow passage (30) are arranged in parallel and the electric power consumption is smaller than if the same were arranged in series. The amount of heat emitted from the electrical component reaches a maximum when the vehicle is traveling at a maximum speed. Meanwhile, the amount of heat emitted from the heat exchanger (22) reaches a maximum when the air conditioner is operated in a full cooling mode while the ambient air temperature is high; and the heat emission peaks at or about two or three minutes after the vehicle starts moving. Consequently, the size of the radiator (42) can be reduced.

As can be appreciated from the above, heat is exchanged between a refrigerant flowing in an air conditioning cooling flow passage (20) and hot fluid flowing in a heater hot fluid flow passage (30) using a fluid-cooled heat exchanger (22). Consequently, the electric power consumed by the electric heater (31) in the heater hot fluid flow passage (30) can reduce by an amount corresponding to a heat of condensation received from the refrigerant in the heat exchanger (22). As a result, when the temperature of the hot fluid in the heater hot fluid flow (30) passage is high, the flow passage selector valve (36) serves to lower the temperature. Also, since the condensation temperature of the refrigerant flowing into the heat exchanger (22) can be held high, the amount of refrigerant circulated inside the air conditioning cooling flow passage (20) can be increased. Thus, the amount of electric power consumed by the electric heater (31) can be reduced while ensuring that there is sufficient dehumidification rate, thus enabling the heating efficiency to be improved.

While only selected embodiments have been chosen to illustrate the present invention, it will be apparent to those skilled in the art from this disclosure that various changes and modifications can be made herein without departing from the scope of the invention as defined in the appended claims. For example, a flow rate of hot fluid allowed to flow from the heater hot fluid flow passage to the electrical component cooling flow passage can be adjusted not only by adjusting an opening degree of the flow passage selector valve but, also, by adjusting flow rates of fluid pumps provided in the respective flow passages. Since the flow passage selector valve and the fluid pumps are driven with electric power, the amount of electric power consumed by the air conditioning system can be reduced further by adjusting the flow rates such that the total electric power consumption is lowered. Furthermore, the functions performed by one component discussed above can be performed by a plurality of components, and vice-versa. Also, the structures and functions of one embodiment can be adopted in another embodiment, and it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air conditioning system comprising:
a duct configured to provide air to a vehicle cabin interior;
a refrigerant evaporator disposed in the duct;
an air conditioning cooling flow passage configured to provide cooled refrigerant to the refrigerant evaporator;
a heater core disposed in the duct at a position downstream of the refrigerant evaporator;
a heater hot fluid flow passage configured to provide hot fluid to the heater core;
a heat exchanger disposed upstream of the heater core and configured to exchange heat between a refrigerant flowing in the air conditioning cooling flow passage and hot fluid flowing in the heater hot fluid flow passage;
an electric heater disposed along the heater hot fluid flow passage in a position downstream of the heat exchanger and upstream of the heater core, the electric heater being configured to further warm hot fluid that has undergone a heat exchange in the heat exchanger;
an electrical component cooling flow passage configured to cool an electrical component installed in the vehicle by passing heat from the electrical component through a cabin exterior heat exchanger;
a communication flow passage configured to connect the heater hot fluid flow passage and the electrical component cooling flow passage together such that the heater hot fluid flow passage and the electrical component are arranged in parallel, the communication flow passage including a first flow passage into which the hot fluid from the heater hot fluid flow passage flows and a second flow passage through which the hot fluid returns to the heater hot fluid flow passage;
a fluid temperature sensor configured to detect a temperature of the hot fluid flowing in the heater hot fluid flow passage; and
a flow passage selector valve that is disposed upstream of the heat exchanger with respect to the heater core at a connecting portion between the heater hot fluid flow passage and the first flow passage, the first flow passage being fluidly connected between the selector valve and a first end of the electrical component cooling flow passage, the second flow passage being fluidly connected to a second end of the electrical component cooling flow passage and the heater hot fluid flow passage at a location upstream of the heat exchanger, the electrical component being located in the electrical component cooling flow passage between the first and second ends, and
the selector valve being configured to allow hot fluid flowing in the heater hot fluid flow passage to flow into the electrical component cooling flow passage to the electrical component via the first flow passage when a temperature of the hot fluid detected by the fluid temperature sensor is higher than a first prescribed temperature, the selector valve being further configured to prevent hot fluid flowing from the heater hot fluid flow passage to the electrical component via the first flow passage when the temperature of the hot fluid detected by the fluid temperature sensor is lower than a second prescribed temperature.

2. The vehicle air conditioning system according to claim 1, wherein
the flow passage selector value is further configured to adjust a flow rate of hot fluid flowing from the heater hot fluid flow passage to the electrical component cooling flow passage by adjusting an opening degree of the flow passage selector valve.

3. The vehicle air conditioning system according to claim 1, further comprising
a fluid pump is disposed in each of the heater hot fluid flow passage and the electrical component cooling flow passage; and
a flow rate of hot fluid flowing from the heater hot fluid flow passage to the electrical component cooling flow passage is adjusted such that a total electric power consumption of the fluid pumps and the flow passage selector valve is decreased.

4. The vehicle air conditioning system according to claim 2, further comprising
a fluid pump is disposed in each of the heater hot fluid flow passage and the electrical component cooling flow passage; and
a flow rate of hot fluid flowing from the heater hot fluid flow passage to the electrical component cooling flow passage is adjusted such that a total electric power consumption of the fluid pumps and the flow passage selector valve is decreased.

5. The vehicle air conditioning system according to claim 1, wherein
the selector valve has an inlet port fluidly connected to the heater hot fluid flow passage, a first outlet port fluidly connected to a downstream section of the heater hot fluid flow passage, and a second outlet port fluidly connected to the first flow passage.

6. The vehicle air conditioning system according to claim 5, wherein
the second flow passage is fluidly connected to the heater hot fluid flow passage between the first outlet port and the heat exchanger.

* * * * *